United States Patent [19]

Dosch et al.

[11] 4,095,989
[45] Jun. 20, 1978

[54] STABILIZED DICALCIUM ALUMINATE HYDRATES

[76] Inventors: Werner Dosch, Alfred-Mumbacherstr. 19, 65 Mainz; Claudia Koestel, Claudiusstrasse 15, 4 Dusseldorf, both of Germany

[21] Appl. No.: 778,295

[22] Filed: Mar. 16, 1977

Related U.S. Application Data

[63] Continuation-in-part of Ser. No. 594,488, Jul. 9, 1975, abandoned.

[30] Foreign Application Priority Data

Jul. 11, 1974 Germany .............................. 2433363

[51] Int. Cl.$^2$ .................................................. C04B 7/32
[52] U.S. Cl. ..................................... 106/104; 106/314; 106/315
[58] Field of Search ................... 106/104, 314, 315, 64

[56] References Cited

U.S. PATENT DOCUMENTS

| | | | |
|---|---|---|---|
| 3,150,992 | 9/1964 | Crowley | 106/104 |
| 3,826,665 | 7/1974 | Hovasse et al. | 106/315 |

*Primary Examiner*—J. Poer
*Attorney, Agent, or Firm*—Burgess, Dinklage & Sprung

[57] ABSTRACT

In the making of a mortar or concrete rich in aluminate cement wherein the cement is mixed with water to hydrate and is thereafter permitted to harden, the improvement which comprises adding to the mixture of cement and water an ionic compound containing anions $X^{n-}$ whereby there are formed mixed crystals of the formula $$[Ca_2Al(OH)_6]^+ {}^{[}(m/n)X^{n-} (1-m)$$

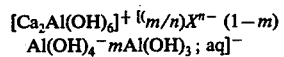

$$Al(OH)_4^- \cdot mAl(OH)_3; aq]^-$$

Preferably $X$ is $NO_2^-$, $SO_3^{2-}$, $S_2O_3^{2-}$, $Fe(CN)_6^{3-}$, $PO_4^{3-}$, $FE(CN)_6^{4-}$, $MnO_4^-$, $ClO_3^-$ or $CrO_4^{2-}$. The mixed crystals are new.

8 Claims, 1 Drawing Figure

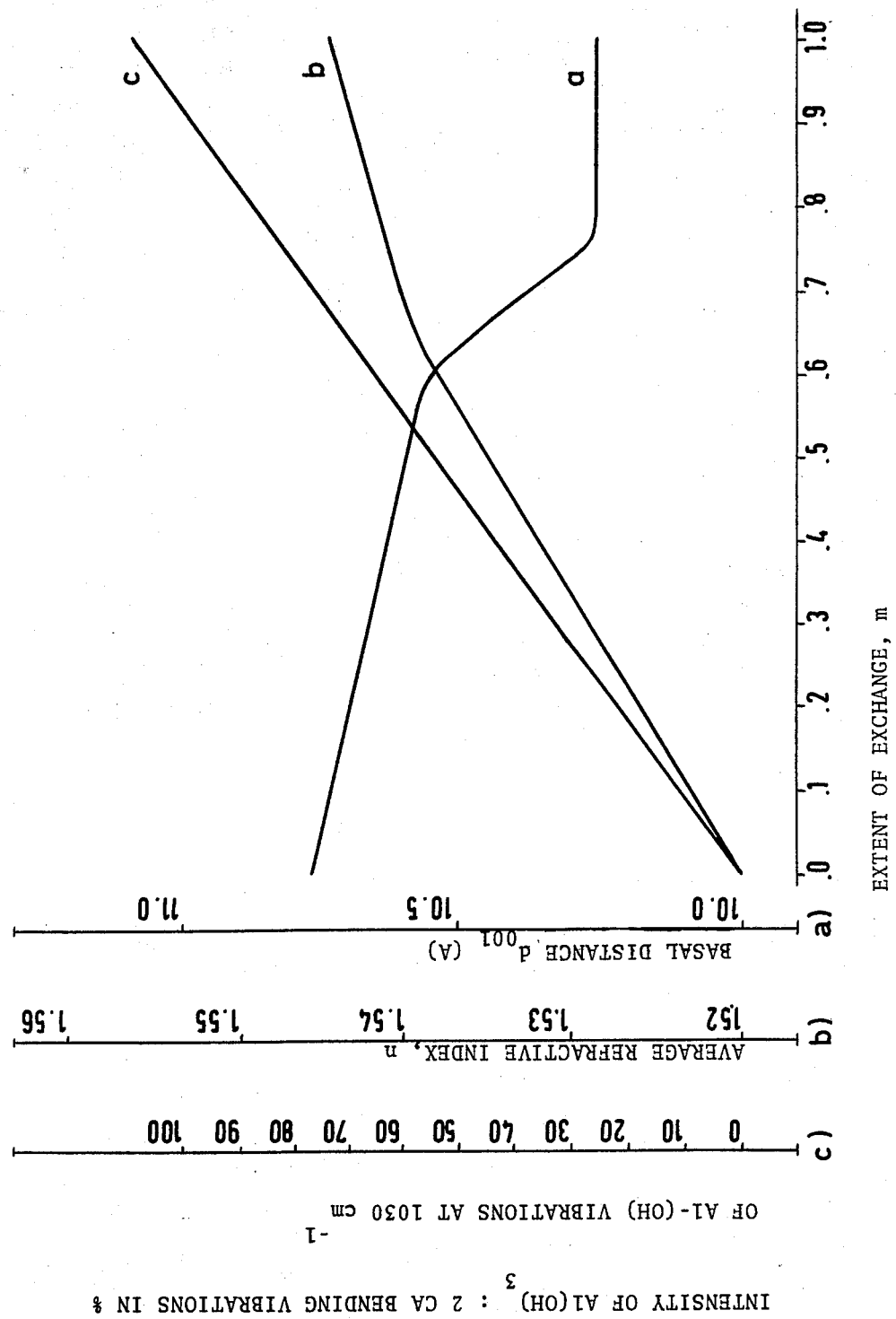

STABILIZED DICALCIUM ALUMINATE HYDRATES

This application is a continuation-in-part of application Ser. No. 594,488, filed Jul. 9, 1975, and now abandoned.

The invention relates to mixed crystals derived from dicalcium aluminated hydrate which are stable at high temperatures and water vapor partial pressures and the use of these mixed crystals in place of the calcium aluminate hydrates formed in the hydration of aluminate-rich cements, in particular high alumina cements, for the purpose of stabilizing the concrete and mortar prepared from said cements.

In contrast to Portland cements which are rich in calcium silicate, high alumina cements basically consist of calcium aluminates and may additionally contain minor amounts of silicates, ferrites and titanates. The degree of hardness of set high alumina cements after 24 hours is generally superior to that of Portland cements after 28 days. Thus, high alumina cements are characterized by rapid hardening. While hydrated Portland cements are attacked by numerous aggressive chemicals partly because of their content of uncombined calcium hydroxide, hydrated high alumina cements are extraordinarily resistant to attack by chemicals by virtue of their high content of gelatinous aluminum hydroxide. Furthermore, mortar and concrete comprising high alumina cements exhibit a good degree of hardness also at high water-cement ratios.

However, these advantages are outweighed by grave disadvantages: Mortar and concrete made of high alumina cements which are considerably more expensive than Portland cements tend to partly lose their hardness at a temperature of above 25° C which destroys the initially obtained hardness and has led to the result that the use of high alumina cements for supporting construction units is no longer officially sanctioned in all countries. The strength loss at elevated temperatures occurs mainly in the case of concretes which are exposed to a high degree of moisture. This is due to the fact that the laminar layer-structure crystals of monocalcium aluminate hydrate ($CAH_{10}$) and dicalcium aluminate hydrate ($C_2AH_8$), which beside gelatinous aluminum hydroxide ($AH_3$) constitute the bulk of the hard high alumina cement, decompose to cubic tricalcium aluminate hydrate ($C_3AH_6$) of higher specific density under considerable volume contraction ($\Delta V$):

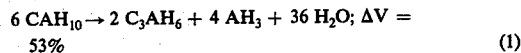

$$6\ CAH_{10} \rightarrow 2\ C_3AH_6 + 4\ AH_3 + 36\ H_2O;\ \Delta V = 53\% \quad (1)$$

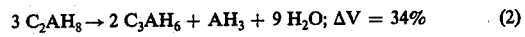

$$3\ C_2AH_8 \rightarrow 2\ C_3AH_6 + AH_3 + 9\ H_2O;\ \Delta V = 34\% \quad (2)$$

These equations are formulated according to the so-called "oxide-type formula" in which C = CaO, A = $Al_2O_3$, H = $H_2O$.

Equations 1 and 2 illustrate that as the primary hydration products decompose, considerable amounts of water are set free and additional $AH_3$ is formed. However, the volume contraction ($\Delta V$) caused by the transition to the more closely packed cubic phase is especially important. Moreover, it has to be observed that the primary laminar hydration products are intermeshed like a house of cards and in view of this texture add to the degree of hardness; however, this is lost as they decompose to the isometric crystal structures of $C_3AH_6$. In comparison to the phenomena associated with the formation of $C_3AH_6$, the influence of the aging of $AH_3$ is not very pronounced. In enumerating the disadvantages of high alumina cements their rapidly proceeding heat development as a result of the very fast hydration reactions must also be mentioned. Reactions (1) and (2) can already take place in voluminous construction units as the cement sets which, thus, to a certain extent, can destroy itself.

The most important clinker components of high alumina cements are monocalcium aluminate (CA) and monocalcium dialuminate ($CA_2$). The high aluminum content causes the simultaneous formation of $AH_3$ during the hydration reactions to $CAH_{10}$ and $C_2AH_8$.

Since $CAH_{10}$ is stable only up to a temperature of 22° C and is transformed to $C_2AH_8$ above this temperature, dicalcium aluminate hydrate is the basic hydration product of high alumina cements. Thus, the inhibition of the decomposition reaction illustrated by equation (2) would be a decisive contribution to the stabilization of high alumina cements.

One of the known measures for inhibiting the $C_3AH_6$ formation is the reduction of the water-cement ratio. In this case, a smaller amount of water than necessary for complete hydration of the cement is added to the latter; the water formed as a result of the decomposition of $C_2AH_8$ (according to (2)) can then react with anhydrous cement still present and thus remains substantially harmless. However, this measure leads to compositions of poor plastic characteristics which are very difficult to handle.

Furthermore, additives of magnesium carbonate, dolomite, dolomite-containing limestone and calcium borates were also recommended for inhibiting and formation of cubic aluminate.

However, it was not possible to completely avoid a long-term deterioration of the hardness characteristics by applying these prior art methods. The object of the invention is to stabilize mortar and concrete consisting of high alumina cements to such an extent that the necessary compressive strengths are obtained and preserved.

Such a stabilization can be accomplished if care is taken that instead of calcium aluminate hydrates usually formed during the hydration of high alumina cements, $CAH_{10}$- and $C_2AH_8$-modified calcium aluminate hydrates are formed as mixed crystals of the general composition:

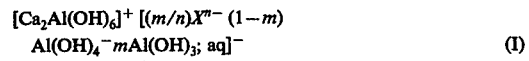

$$[Ca_2Al(OH)_6]^+\ [(m/n)X^{n-}\ (1-m)\ Al(OH)_4^-\ mAl(OH)_3;\ aq]^- \quad (I)$$

wherein $X^{n-}$ represents inorganic or organic anions having the charge $n$ and $m \leq 1$.

The drawing is a graph showing the results of tests performed to establish the existence of the mixed crystals.

In these novel mixed crystals, the ratio C/A=2, hence, it is identical with that of the compound $C_2AH_8$. Mixed crystals of the specified composition (I) are unusual in that they contain two anions which are different from $OH^-$ jointly in the same interlayer. Furthermore, it is unusual that $Al(OH)_4^-$ which has lost its charge as a result of the incorporation of anions $X^{n-}$ is not removed from the intermediate layer but remains therein in the form of $Al(OH)_3$. The favorable C/A-ratio = 2 is only obtained thereby. The existence of mixed crystals according to (I) can be demonstrated for example by the incorporation of $X^{n-} = CrO_4^{2-}$ by the change of the basal distance $d_{001}$(A) (curve a of the drawing), the average refractive index n (curve b of the drawing) and the intensity of the Al—OH bending vibrations at 1030 cm$^{-1}$ measured by infrared spectroscopy (curve c) characterizing the incorporation of Al(OH)$_3$. Thus, evidence is furnished that the mixed crystals of the subject invention are novel defined substances. Beside $CrO_4^{2-}$ the mixed crystals (I) according to the invention could be prepared by the following anions $NO_2^-$, $SO_3^{2-}$, $S_2O_3^{2-}$, $Fe(CN)_6^{3-}$, $Fe(CN)_6^{4-}$, $MnO_4^-$ and $ClO_3^-$. According to the invention, salts of these anions, preferably the alkaline salts, serve as stabilizers for mortar and concrete made of high alumina cements. They may be either admixed to the dry high alumina cement or during the preparation of the mortar or concrete.

It could be demonstrated that the mixed crystals of the subject invention exhibit an extraordinarily stable behavior even under conditions of high relative moisture and elevated temperature of from 70° to 80° C. Here, the temperature stability is particularly important especially under the conditions of high relative humidity since humidity favors reactions (1) and (2), whereas the hydration products $CAH_{10}$ and $C_2AH_8$ are relatively temperature-stable only in dry climates. This is proved by Table 1 which shows the thermal stability of compounds of Formula (I) after 24-hour storage of the samples at 70° C and 100% relative humidity.

Table 1

| Anion X | Exchange rate m | Stability |
|---|---|---|
| without additive | 0 | decomposed to $C_3AH_6$ |
| $CrO_4^{2-}$ | 0.2 | partly stable |
| " | 0.3 | stable |
| " | 1.0 | stable |
| $NO_2^-$, $SO_3^{2-}$, $MnO_4^-$, $Fe(CN)_6^{3-}$ $Fe(CN)_6^{4-}$, $ClO_3^-$ | 0.1 | stable |
|  | 0.25 | stable |
|  | 0.5 | stable |
| $S_2O_3^{2-}$ | 0.25 | partly stable |
| " | 0.5 | stable |

The reason for the superior stability of Compounds (I) of the subject invention could be clarified: The groups $X^{n-}$ and $Al(OH)_4^-$ in Formula (I) are present in the form of loosely bonded exchangeable anions isolated from each other by hydration water. In contrast, the Al(OH)$_3$ molecules are stratified with lattice-like polymerization and form the space-lattice arrangement of the hydrargillite structure. The loosely bonded anions $X^{n-}$ and $Al(OH)_4^-$ in (I) are arranged between the hydrargillite sites and are thus sterically hindered in their movement. The excellent stability of Compounds (I) according to the invention is a result of the presence of the polymeric Al(OH)$_3$ groups in the intermediate layer.

The preparation of the mixed crystals of the subject invention will become evident from the following characteristic examples:

EXAMPLE 1

Preparation of a mixed crystal according to (I) derived from $C_2AH_8$ by incorporating chromate ions at an exchange rate m = 0.5:

40 g $C_2AH_8$ + 4.5 g $Na_2CrO_4$ are agitated with 1000 g water for 2 days at 22° C and subsequently filtered. The basal distance $d_{001}$ of the product moist with mother liquor amounts to 10.59 A. The product remains unaltered after 24-hours storage at 70° C, 100% humidity; $C_3AH_6$ is not formed.

EXAMPLE 2

Preparation of mixed crystals derived from $C_2AH_8$ by incorporating chromate ions during the hydration of high alumina cements:

100g high alumina cement are added to 112 g $CaCrO_4$ and mixed with 670 g water - corresponding to a water-cement ratio of 0.6- and stored for one year at 22° C. The radiograph of the subsequently ground cement stone shows the $CrO_4$-mixed crystal of $C_2AH_8$ corresponding to an exchange rate of m = 0.5. $C_3AH_6$ is not formed and that not even upon exposure of the product to a temperature of 70° C for 24 hours at 100% humidity.

EXAMPLE 3

Stabilization of high alumina cements:

According to the German standard DIN1164, prisms of 4 × 4 × 16 cm$^3$ having a water-cement ratio of 0.5 were prepared from high alumina cement without additives and with additives of 2.2 percent by weight $CaSO_3 \cdot \frac{1}{2} H_2O$ and 10.7 percent by weight $CaCrO_4$. They were stored for 24 hours in the mold at 20° C and 100% relative atmospheric humidity and thereafter in water at a temperature of 30° C. The compressive strengths evident from Table 2 were obtained.

Table 2

|  | Compressive Strength (kp/cm$^2$) after | | |
|---|---|---|---|
|  | 1 | 7 | 28 days |
| without additive | 372 | 739 | 373 |
| with 2.2% $CaSO_3 \cdot \frac{1}{2}H_2O$ | 331 | 528 | 596 |
| with 10.7% $CaCrO_4$ | 365 | 562 | 624 |

The tests demonstrate that samples of high alumina cement with the additives do not lose their strength after storage for 28 days at 30° C while the strength of samples without stabilizing additives is reduced to 50% of its value after 7 days. Radiographic studies directly confirm this result in that in the case of the stabilized samples, the cubic $C_3AH_6$ did not occur up to 28 days whereas it is clearly present in the non-stabilized samples.

As can be seen from their presentation in Table 1, a preferred sub-group of anions comprises $CrO_4^{2-}$, $NO_2^-$, $SO_3^{2-}$, $MnO_4^-$, $Fe(CN)_6^{3-}$, $Fe(CN)_6^{4-}$, $ClO_3^-$ and $S_2O_3^{2-}$; a narrower most preferred group comprises $NO_2^-$, $SO_3^{2-}$, $MnO_4^-$, $Fe(CN)_6^{3-}$, $Fe(CN)_6^{4-}$, $ClO_3^-$ and $S_2O_3^{2-}$. These anions may be supplied as alkali metal salts but alkaline earth metal salts, especially calcium, are preferred. The anions may even be added as the free acids and the salts formed in situ from appropriate alkalis containing the desired cation.

As noted, the shaped masses can be used in construction such as by simply using them like cinder blocks or concrete slabs. Alternatively, the granular materials can be mixed with water and poured into molds on site, optionally with steel reinforcements, to produce molded concrete floors, ceilings, and the like. The fluid masses can even be used as mortar between bricks and blocks in construction. While in some of these end uses it is possible to fire the material after setting, in others it is not possible but at any rate it is an advantage of the invention that the increased strength and stability are realized without the need for firing, resulting from the presence in the set material of the mixed crystals of the recited composition. Actually it is believed firing would result in a change in the chemical composition of such crystals.

It will be appreciated that the instant specification and examples are set forth by way of illustration and not limitation, and that various modifications and changes may be made without departing from the spirit and scope of the present invention.

What is claimed is:

1. In the production of a structure including a concrete or mortar rich in aluminate cement wherein said concrete is formed by mixing said cement with water to hydrate and thereafter permitting the mixture to harden, the improvement which comprises adding to the mixture of cement and water an ionic compound containing anions $X^{n-}$ whereby there are formed and are present in the end product mixed crystals of the formula $$[Ca_2Al(OH)_6]^+ \, [(m/n)X^{n-} \, (1-m) \, Al(OH)_4^- \, mAl(OH)_3; \, aq]^-$$

wherein $X^{n-}$ is an anion of charge n selected from the group consisting of $NO_2^-$, $SO_3^{2-}$, $S_2O_3^{2-}$, $Fe(CN)_6^{3-}$, $Fe(CN)_6^{4-}$, $MnO_4^-$, $ClO_3^-$ and $CrO_4^{2-}$, and $m$ is $\leq 1$, whereby the mortar or concrete is stabilized in strength.

2. A method according to claim 1, wherein the ionic compounds are alkaline earth metal salts.

3. A method according to claim 1, wherein the ionic compounds are calcium salts and the anions $X^{n-}$ are added in amounts of from 0.05 to 0.5 gram equivalent per mole of Ca of the aluminate-rich cement.

4. A method according to claim 3, wherein X is selected from the group consisting of $NO_2^-$, $SO_3^{2-}$, $Fe(CN)_6^{3-}$, $S_2O_3$, $Fe(CN)_6^{4-}$, $MnO_4^-$, $ClO_3^-$, and the structure is a building, said concrete or mortar upon hardening being directly employed in said structure without intermediate firing.

5. Hardened mortar or concrete containing mixed crystals of the formula $$[Ca_2Al(OH)_6]^+ \, [(m/n)X^{n-} \, (1-m) \, Al(OH)_4^- \, mAl(OH)_3; \, aq]^-$$

wherein $X^{n-}$ is an anion of charge n selected from the group consisting of $NO_2^-$, $SO_3^{2-}$, $S_2O_3^{2-}$, $Fe(CN)_6^{3-}$, $Fe(CN)_6^{4-}$, $MnO_4^-$, $ClO_3^-$ and $CrO_4^{2-}$, and $m$ is $= 1$.

6. A mortar or concrete according to claim 5, wherein X is selected from the group consisting of $NO_2^-$, $SO_3^{2-}$, $Fe(CN)_6^{3-}$, $S_2O_3$, $Fe(CN)_6^{4-}$, $MnO_4^-$, $ClO_3^-$, and is present in about 0.05 to 0.5 gram equivalent per mole of Ca.

7. A building including unfired mortar or concrete according to claim 5.

8. A building including unfired mortar or concrete according to claim 6.

* * * * *